C. RUDY.
SHOCK ABSORBER.
APPLICATION FILED MAR. 22, 1920.
1,384,970. Patented July 19, 1921.
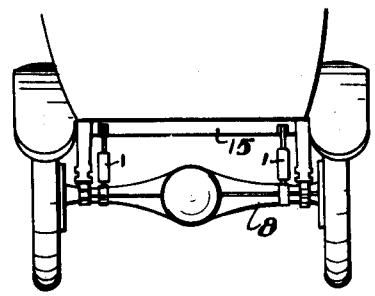
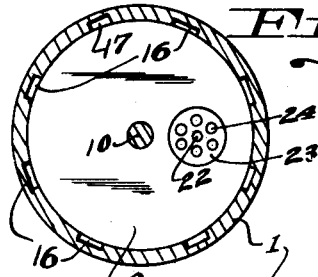
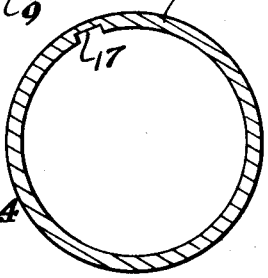
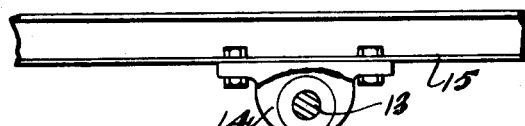
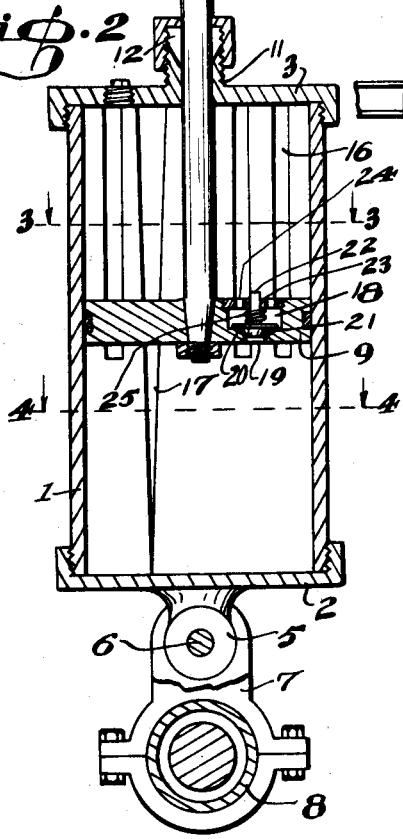
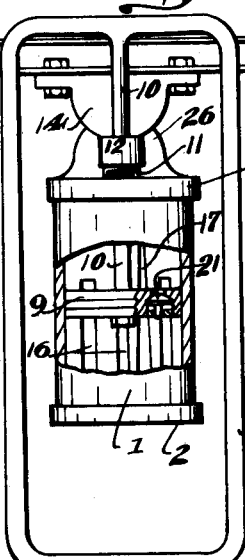
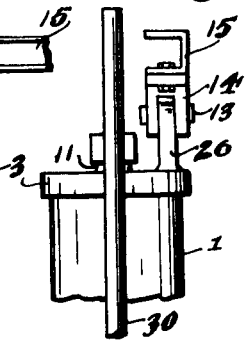
INVENTOR
Charles Rudy
By Hazard & Miller
Att'ys.

UNITED STATES PATENT OFFICE.

CHARLES RUDY, OF LOS ANGELES, CALIFORNIA.

SHOCK-ABSORBER.

1,384,970.   Specification of Letters Patent.   Patented July 19, 1921.

Application filed March 22, 1920. Serial No. 367,801.

*To all whom it may concern:*

Be it known that I, CHARLES RUDY, a citizen of the United States, residing at Los Angeles, in the county of Los Angeles and State of California, have invented new and useful Improvements in Shock-Absorbers, of which the following is a specification.

My invention is an improved shock absorber particularly useful on automobiles in which a medium in the form of either a gas or liquid or a combination of the two may be used for absorbing the shock of the recoil of the automobile springs. My absorber may be readily applied to any standard automobile.

Referring to the annexed drawing which forms a part of this specification,

Figure 1 is a rear view of an automobile with my shock absorber applied thereto.

Fig. 2 is a vertical longitudinal section of my shock absorber.

Fig. 3 is a horizontal section of my shock absorber taken on line 3—3 of Fig. 2.

Fig. 4 is a horizontal section taken on line 4—4 of Fig. 2.

Fig. 5 is a side elevation of a modified form of my invention.

Fig. 6 is a rear elevation of the upper portion of my modified shock absorber shown in Fig. 5.

In the drawings 1 indicates a cylinder on the lower and upper ends of which are screwed heads 2 and 3 respectively. A lug 5 depends from the lower head 2 and is pivotally connected by a pivot 6 to a clamp 7 which may be clamped to the rear axle housing 8 of an automobile. In the cylinder 1 is a reciprocative piston 9 to which is connected a piston rod 10 which extends through a bearing 11 on the upper head 3 and through a packing box 12 on the upper end of said bearing, the upper end of said piston rod being pivotally connected by a pivot 13 to a bracket 14 secured to the rear of the automobile body frame 15. The cylinder 1 is formed with a plurality of longitudinal grooves 16 which extend from the upper end of the cylinder to a point below the median height thereof and with a longitudinal groove 17 extending all the way from the upper end to the lower end of the cylinder and tapering from the upper end to the lower end of the cylinder to a point.

The piston 9 is provided with a transverse bore 18 extending downwardly from its upper face and with a port 19 leading from said bore through the lower face of said piston, there being a valve seat 20 between the bore 18 and the port 19 for seating a valve 21. The valve 21 has a stem 22 which extends through and is mounted to reciprocate in a disk 23 screwed into the upper end of the bore 18 which disk is provided with a plurality of ports 24. A spring 25 is coiled about the valve stem 22 between the valve 21 and the disk 23, said spring normally holding said valve upon its seat 20 and closing the port 19.

In the modified form of my invention shown in Figs. 5 and 6, I provide an upstanding ear 26 on the cylinder head 3 which I pivot to the bracket 14 by means of the pin 13. I provide a vertical rectangular frame 30, to the upper end member of which I connect the upper end of the piston rod 10 midway between the longitudinal vertical members of the frame and on the lower end member of said frame I provide a clamp 31 which clamps upon the axle housing 8. I place a gas or a liquid or a combination of the two in the cylinder 1.

The grooves 16 extend upwardly from the lower end of the cylinder to a point just above the median height thereof and the groove 17 extends from the lower end of the cylinder to the upper end thereof tapering in an upward direction to a point.

The operation of the forms of my invention disclosed in Figs. 1 to 4 inclusive is as follows:

When the body of the automobile descends and compresses the automobile springs the piston 9 is moved downwardly in the cylinder 1, the valve 19 opening upwardly against the tension of the spring 25 and allowing the cushioning medium in the cylinder to pass through the port 19, bore 18 and ports 24, from the lower to the upper part of the cylinder. When the automobile springs recoil and the body of the automobile moves upwardly with relation to the axle housing the piston 9 is drawn upwardly, the valve 21 closing, and at first the piston forces a small amount of cushioning medium from above the piston through the groove 17 below the piston thus resisting the initial recoil action of the springs with considerable force, and as the piston continues its upward movement and rises above the lower ends of the grooves 16 a large amount of the cushioning medium is forced downwardly from above the piston through the grooves 16 below the piston, thus offering less resistance to the recoil of the automobile springs as said springs approach their normal position.

The operation of the modified form of my invention shown in Figs. 5 and 6 is as follows:

When the body of the automobile descends with relation to the axle housing and compresses the automobile springs, the piston 9 is drawn upwardly in the cylinder 1, the valve 21 which is mounted to operate in a direction opposite to the valve in the first described form of my invention, opening downwardly and permitting the cushioning medium to pass from the upper part of the cylinder through the piston and into the lower part of the cylinder. When the automobile springs recoil and the automobile body rises with relation to the axle housing, the piston 9 is forced downwardly and a small amount of cushioning medium is first forced from below the piston through the groove 17 above the piston thus resisting with considerable force the initial action of the recoil of the automobile springs, and as the piston continues its downward movement to a point below the upper ends of the grooves 16 a large amount of the cushioning medium is forced from below the piston upwardly through said grooves above the piston, thus reducing the resistance to the recoil action of the automobile springs as said springs approach their normal position.

It will be noted that when the automobile springs recoil the piston 9 of the form of my invention shown in Figs. 5 and 6, moves downwardly toward the solid head 2 of the cylinder so that no pressure during the recoil action of the springs is applied to the bearing 11, thus taking the strain off said bearing and providing a shock absorber of maximum strength.

Various changes may be made without departing from the spirit of my invention as claimed.

I claim:

1. A shock absorber including a cylinder, a piston mounted to reciprocate in said cylinder, means for connecting said cylinder and said piston to suitable points of the automobile; a valve in said piston for opening and permitting the cushioning medium to pass through the piston when the piston moves in one direction; means for permitting at first a small amount of the cushioning medium to pass the piston when it moves to a predetermined point in the opposite direction; and means for permitting a greater amount of said cushioning medium to pass the piston when the piston moves in said opposite direction beyond said predetermined point.

2. A shock absorber including a cylinder; a piston mounted to reciprocate in said cylinder; means for operatively connecting the cylinder and the piston to an automobile; a valve in said piston for opening and allowing the cushioning medium in the cylinder to pass through the piston as the piston moves under the influence of the downward movement of the automobile body; a groove provided in said cylinder extending from one end of the cylinder to the other for allowing a small amount of the cushioning medium to pass the piston as the piston moves in the opposite direction under the influence of the recoil action of the automobile springs, and a plurality of grooves extending from one end of the cylinder to a point about the median height of the piston for allowing a larger amount of the cushioning medium to pass the piston as the recoil action of the automobile springs approaches its limit.

3. A shock absorber including a cylinder and a piston mounted to reciprocate in said cylinder, means for connecting said cylinder to the axle housing; a piston rod extending through the upper head of the cylinder and connecting to the automobile body; a valve in said piston for opening upwardly when the piston moves downwardly to permit the cushioning medium in the cylinder to pass through the piston from the lower part into the upper part of the cylinder; a groove in the inner surface of said cylinder extending the entire length of the cylinder and a plurality of grooves extending from the upper end of the cylinder to a point about the median height thereof.

4. A shock absorber including a cylinder and a piston mounted to reciprocate in said cylinder; means for connecting said cylinder to the axle housing; a piston rod extending through the upper head of the cylinder and connecting to the automobile body; a valve in said piston for opening upwardly when the piston moves downwardly to permit the cushioning medium in the cylinder to pass through the piston from the lower part into the upper part of the cylinder; a groove in the inner surface of said cylinder extending the entire length of the cylinder and a plurality of grooves extending from the upper end of the cylinder to a point about the median height thereof; the groove extending the entire length of the cylinder tapering from the upper end to the lower end of the cylinder.

In testimony whereof I have signed my name to this specification.

CHARLES RUDY.